UNITED STATES PATENT OFFICE.

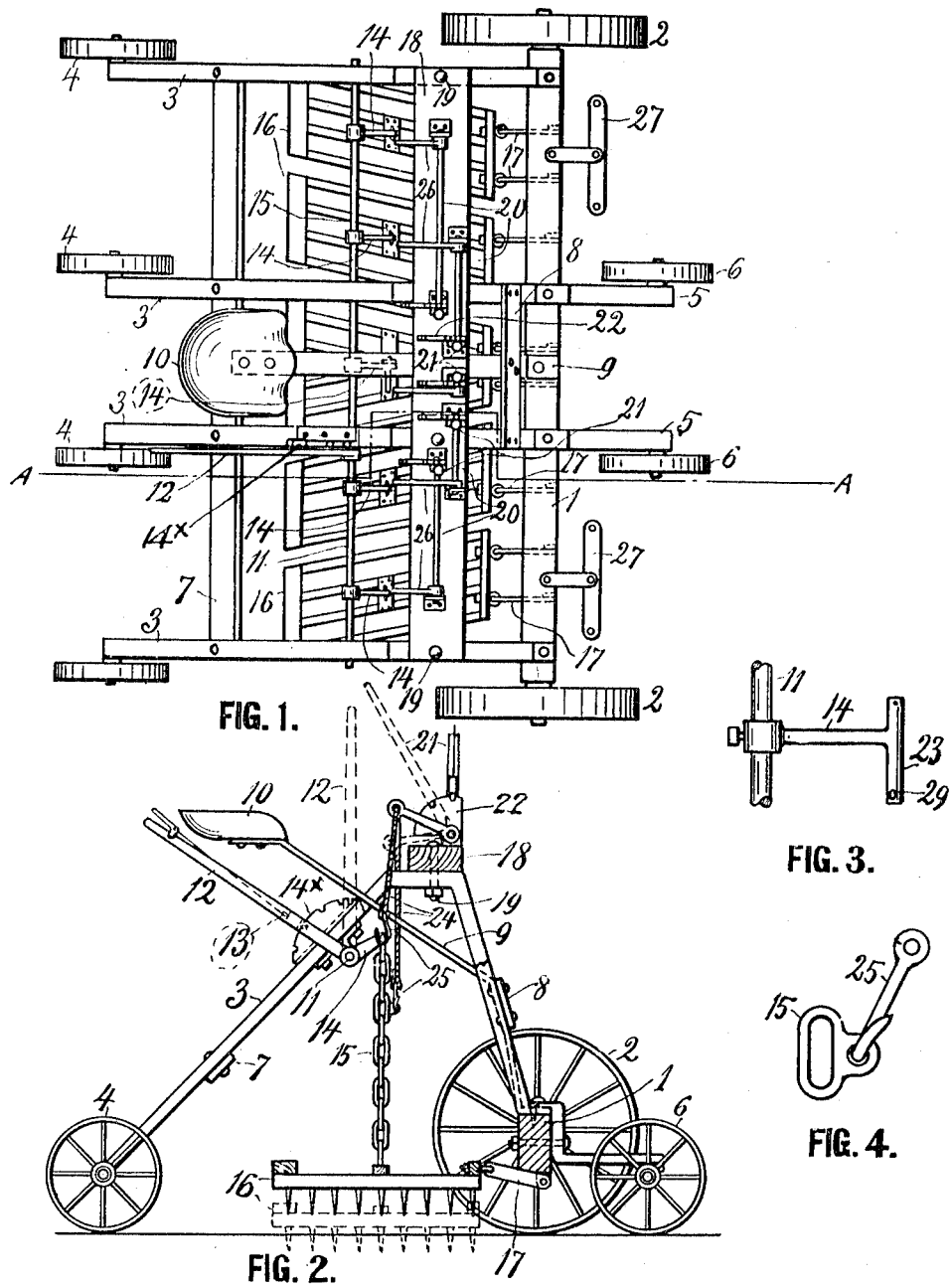

ANDREW CLAUSON, OF HARLOW, NORTH DAKOTA.

HARROW.

1,117,328. Specification of Letters Patent. Patented Nov. 17, 1914.

Application filed March 2, 1914. Serial No. 821,917.

*To all whom it may concern:*

Be it known that I, ANDREW CLAUSON, a subject of the King of Norway, residing at Harlow, in the county of Benson and State of North Dakota, have invented a new and useful Harrow, of which the following is a specification.

My invention relates to improvements in harrows, and the objects of the invention are to provide a harrow with a lifting means for all the harrow sections at one time and also with means for lifting each section independently, also to make the latter means detachable from the riding frame of the harrow; also to provide an extra large number of harrow sections with an efficient riding frame by which they may be drawn when in action and carried when idle.

In the accompanying drawing, Figure 1 is a top view of my improved harrow. Fig. 2 is a sectional side elevation on the line A—A Fig. 1. Fig. 3 is a detail top view of a portion of the rock-shaft and the rocker arm lifting the middle section of the harrow. Fig. 4 is a detail view of a link of a harrow-lifting chain and a hook engaging the same.

Referring to the drawing by reference numerals, a riding frame is composed of a heavy front bar 1, on whose ends the main supporting wheels 2 are journaled, and four rearwardly extended arched frame bars 3 provided with smaller ground wheels 4. Two of the frame bars 3 are formed with forward extensions 5 having ground wheels 6 to prevent possible forward tilting of the riding frame. Said frame may also have a rear brace bar 7 and a short front brace bar 8 to make it firm. To the last mentioned bar and to the axle bar 1 is secured the post 9 of a seat 10.

Journaled across the frame is a rock-shaft 11 having a lever 12 with a dog 13 arranged to engage in a notched sector 14˟ on the frame. Said shaft is provided with five arms 14, each of which is connected by a chain 15 to one of five harrow sections 16. Said sections are connected by draft-links 17 near the front edge of the under side of the axle bar 1 so that when the harrow sections are lifted by the arms 14 the links will impinge under the axle bar and limit the elevation of the front ends of the sections and thereby cause the chains 15 to lift the slightly heavier rear portions of the harrow sections to a level with the front portions, thus securing a level position of the harrow sections when they are supported in idle position above the ground.

Besides the means just described for lifting all the harrow sections simultaneously I also provide means for lifting one section at a time; the latter means form an attachment composed of a frame bar 18, which has its ends detachably secured to the main frame by bolts 19. Upon said bar 18 are mounted five small rock-shafts 20, each of which is provided with a hand lever 21 arranged to engage a notched sector 22. The middle one of the arms 14 is provided with a lateral projection 23 (see Fig. 3) having a hole 29 for the reception of a hook 25 of a cable 24 and depending from the middle one of the hand levers 21, the extension 23 being employed to reach under the seat post 9, or from under it, as will be the same thing. The four other small rock-shafts are provided each with a rocker arm 26 and a chain or cable 24 suspended therefrom and provided with a hook 25 engaging the main chain 15 of one of the other harrow sections.

27 designate either swingle-trees to which two horses may be hitched for drawing the harrow, or, double-trees which may have whiffle-trees (not shown) attached one to each end thereof when the land is such as to require four horses to draw the harrow.

In the operation of the machine, if one or more of the harrow sections catch a lot of weeds, roots or other obstructive matter, the driver, who occupies the seat 10, uses the proper one or more of the small hand-levers 21 in lifting the obstructed harrow section over its obstruction, and then lets it down again, all while the harrow is in motion. And if he wants all the sections lifted so as to turn the harrow in a reverse direction or for driving it idle, he applies the long lever 12, raising all the sections simultaneously. If much harrowing is to be done in old fields, in which there is no obstructive matter, the frame bar 18 may be detached at its ends and after the hooks 25 have been disengaged from the main lifting chains 15 to bar 18 with everything mounted on it may be removed from the machine until it is needed again, when it takes but a few minutes to replace it.

What I claim is:

In a riding harrow, a frame composed of a main front bar with main riding wheels at the ends thereof, rearwardly extending arched frame bars having their front ends secured to said main bar and their rear ends provided with smaller riding wheels, also one or more ground wheels arranged forward of the main frame bar, and bracing bars across the arched bars, a series of harrow sections link-connected to the main front bar, and means upon the frame for raising the harrow sections.

In testimony whereof I affix my signature, in presence of two witnesses.

ANDREW CLAUSON.

Witnesses:
OLE TALLEPSON,
A. V. MOLDEN.